United States Patent [19]
Fabris

[11] Patent Number: 5,667,228
[45] Date of Patent: Sep. 16, 1997

[54] QUICK CHANGE MANDREL FOR AN ENGINE LATHE ETC

[76] Inventor: Mario Fabris, 188 N. Service Rd., Grimsby, Ontario, Canada, L3M 4E8

[21] Appl. No.: 492,796

[22] Filed: Jun. 20, 1995

[51] Int. Cl.⁶ ................................................. B23B 31/40
[52] U.S. Cl. .............................. 279/143; 82/168; 82/169; 279/2.02
[58] Field of Search .................................. 279/2.02–2.04, 279/143–145; 82/165, 168, 169

[56] References Cited

U.S. PATENT DOCUMENTS

| 2,738,980 | 3/1956 | Spahn | 82/169 |
| 4,647,051 | 3/1987 | Stone et al. | 279/2.04 |

*Primary Examiner*—Steven C. Bishop
*Attorney, Agent, or Firm*—E. H. Oldham

[57] ABSTRACT

A two piece mandrel having two co-operating interfitting parts (similar to a bayonet type assembly) which may be twisted apart, or twisted together by means of a series of interlocking projections having complimentary ramping surfaces. The co-operating parts have a pair of reference surfaces that assure concentricity of the two mating parts.

15 Claims, 2 Drawing Sheets

QUICK CHANGE MANDREL FOR AN ENGINE LATHE ETC

This invention relates to a mandrel which is intended to be used in a machine shop or other industrial establishment which is mounted on engine lathes, grinders, etc. where workpieces must be rigidly clamped and rotated for performing some kind of operation on the workpiece. The mandrel itself is composed of a mating pair of units which are connected together by a bayonet type interlocking construction when completed creates a unitary device.

The mandrel itself has a tapered nose adaptor which is mounted on the rotating spindle of an engine lathe, so that it may rotate within a certain prescribed degree of concentricity with the spindle of the engine lathe. The mandrel has provision for receiving and clamping a suitable workpiece on an expandable sleeve or mandrel. This portion of the mandrel is capable of being quickly removed from the tapered nose adaptor in order that a different workpiece receiving mandrel may be quickly mounted in the tapered nose adaptor of the mandrel which is attached to the lathe spindle. The exchange of the workpiece receiving mandrels may take place in a matter of seconds.

BACKGROUND OF THE INVENTION

Various types of expanding and contracting chucking devices and/or clamping devices of similar character have been used in factories and workshops for the clamping of rotatable workpieces. These workpieces may then be machined, ground, or polished in a variety of shop operations all of which require the workpiece to be precisely rotated. For reasons of precision and accuracy mandrels capable of expansion or contraction used in the past were able to accommodate workpieces within a very limited range of diameters due to the loss of contact grip which occurs when the mandrel is expanded or contracted beyond its designed expansion limit. Because of this limitation, it is necessary to replace the mandrels (or inserts) in shop lathes, etc. at the end of each production run in order to accommodate the next run of workpieces which have a different diameter.

Previously when this situation arose, the entire mandrel was removed from the mounting spindle of the lathe to which it was attached, usually by removing several cap screws from the mounting boss of the mandrel, and the replacement mandrel is precisely located against the spindle mounting device, the mounting holes aligned, and the fastening cap screws replaced. This replacement operation may require considerable shop time.

Various types of quick change mandrels and chucks have been proposed for use in industry in the past and the designs have used a clamping mechanism which encompass the use of balls, ramps and springs which function in a manner similar to the principle used in air line chucks. Most of the quick change devices are relatively small and are best suited to small power operations. See U.S. Pat. Nos. 4,861,201, 4,749,316, 4,743,145, 4,309,042, 4,290,617 and 4,273,344 for a variety of the prior art devices. A slightly larger quick change chuck is shown in U.S. Pat. No. 5,326,114.

These devices while functioning in a quick change manner do not have the convenience and the power transmission capability of the mandrel type chuck of this invention.

In workshop operations where powerful machinery is used for stock removal or surface profile forming, some type of mandrel must be used which will tolerate the heavy mechanical forces involved. For replacement of chucks and mandrels of the power handling capability of the devices of this invention, the classical approach to such a change has usually involved removing the complete mandrel or chuck from a mounting spindle of the lathe and re-mounting another chuck or mandrel on the spindle mounting device. Because of the nature of the machinery involved, the ever presence of foreign material makes the replacement operation difficult and during the change operation, sometimes the mounting bolts may be misplaced or lost. The weight of the mandrel device also has a tendency to complicate the replacement operation.

SUMMARY OF THE INVENTION

The present invention will drastically decrease the time required for the mandrel replacement and at the same time simplify the mandrel change operation. The decrease in time required for mandrel exchange is important because such exchange is required of many types of machines used in the industrial workplaces.

This invention utilizes a rotating chuck device which is comprised of two portions, a first portion being in the form of an adaptor which is designed to mate with a rotating spindle of the shop machine or lathe on which it is mounted. A second portion (an insert) is mated with the adaptor and snap locked in position in the adaptor by a bayonet assembly so as to be exactly co-axial with the adaptor and lathe spindle, and, in fact, become a unitary rotating entity. The insert will be provided with some suitable workpiece clamping mechanism at the end opposite the bayonet assembly.

The rotating mandrel may then function to receive a workpiece upon which some shop operation is to be performed.

It will be seen that the device of this invention will enable the swift replacement of lathe-type chucking devices without any compromise in safety, accuracy and precision.

PREFERRED EMBODIMENT OF THE INVENTION

Figure 1:
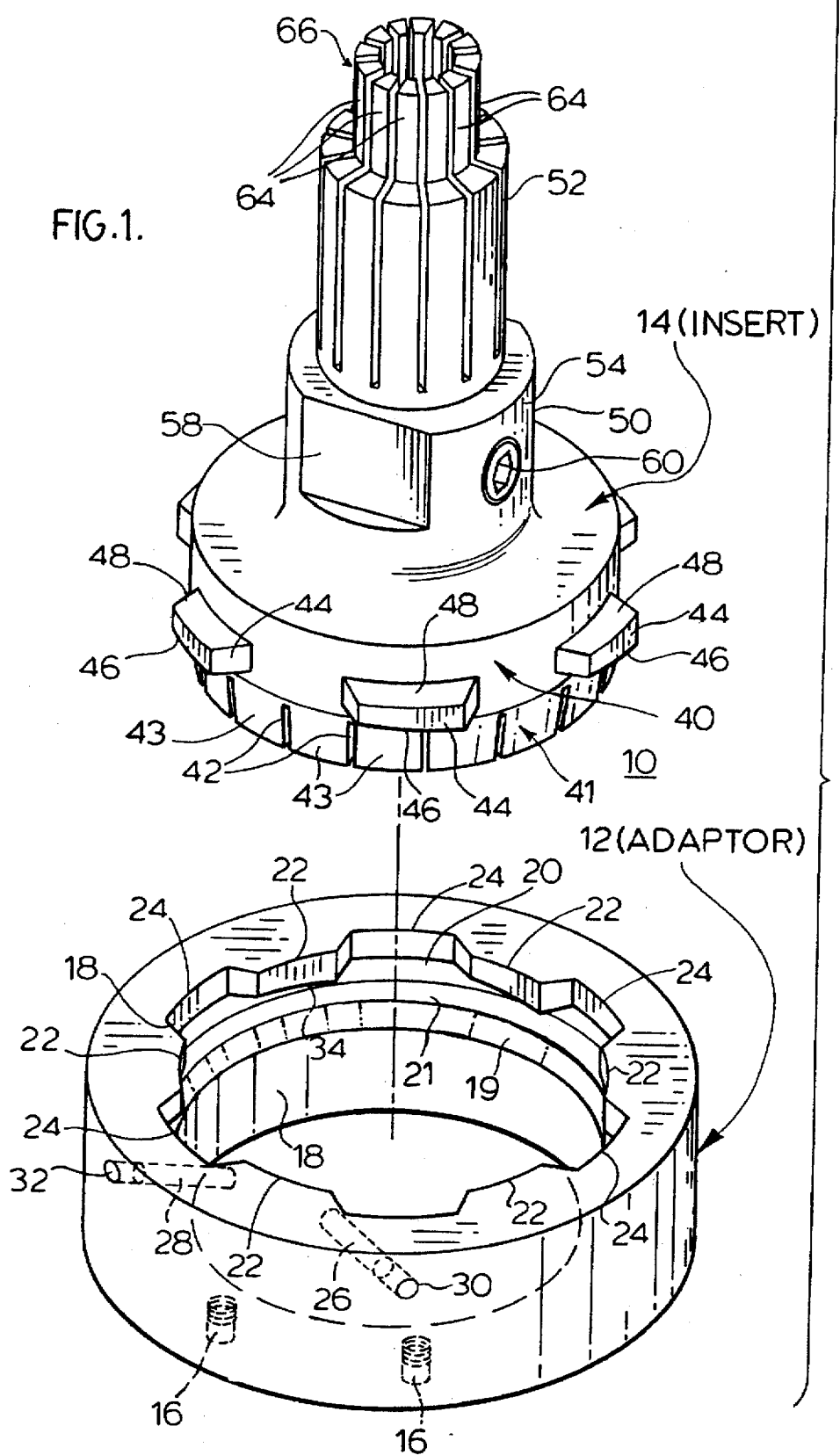
FIG. 1 is an exploded view of the device of this invention.

FIG. 1 shows mandrel 10 of this invention in its detached position. An adaptor 12 is shown which will be attached to the mounting spindle of a shop engine lathe. Shown above the adaptor 12 is a workpiece receiving member 14 hereinafter referred to as an insert.

Adaptor 12 is in the form of a hollow cylinder 16 and may have plurality of threaded holes 16 in the lower surface thereof for attachment to the rotating spindle of the lathe or machine to which it is to be attached. The method of mounting adaptor 12 to a rotating spindle as shown here is referred to as a camlock spindle mounting and as such, forms no part of this invention.

The adaptor 12 has a hollow interior having a central bore 18 the lower portion of which is of constant diameter. Surface 18 has a somewhat annular groove 20 provided therein, which has a flat lower surface 21 and above which are shown projections 22 which protrude toward the centre of the member 12. These projections are evenly spaced and are separated by recesses 24. (Each projection 22 has a sloping lower surface 34 in the form of a ramp.)

Surface 18 is provided with a conical taper at 19 which is located just below surface 21.

A pair of lock screws 26 and 28 are located in adaptor 12 in the threaded holes 30 and 32.

Insert 14 is shown having a somewhat cylindraceous base portion 40 of a diameter slightly less than the diameter of bore 18 of adaptor 12. The lower surface 41 of insert 14 is conical taper which is matched to the conical taper 19 in adaptor 12. A series of slots 42 are located in the lower portion 41 of base 40 to divide the lower portion into "teeth" 43.

A series of projections 44 are shown arising radially from the base portion 40 at equally spaced intervals around the circumference of the base 40. Each of the projections 44 has a flat lower surface 46 and a sloping upper surface 48 which forms a ramp similar to each ramped surface 34 of projections 22. The projections 44 have a height slightly less than the depth of groove 20 in adaptor 12.

Insert 14 is shaped to produce a work receiving portion 50 which in this instance is an expanding sleeve type chuck 52 which forms no part of this invention.

Although the chuck 50 forms no part of this invention, it will be described in brief detail. From base 40, the member 14 is reduced in size to cylinder 54 in which a pair of opposing flats 58 are formed. Also located in cylinder 54 is a shaft 60 carrying an eccentric cam used to move an interior pin (not shown) axially up and down which will expand and contract the segments 64 of the expanding mandrel 66 upon which the work is to be mounted.

The operation of the quick change mandrel is as follows:

Adaptor 12 is secured to a rotating spindle which is of a standard configuration (in this instance, a camlock spindle nose) to mate with adaptor 12. Adaptor 12 will be centered on the spindle nose by suitable means (not part of this invention). At this time, a suitable insert such as insert 14 incorporating mandrel 66 is fitted into the adaptor 12.

Assuming the adaptor 12 is mounted as shown in FIG. 1 so as to have a vertical rotating axis, the insert 14 is lowered so that the base 40 passes between the ends of projections 22 of adaptor 12. The conically tapered portion 41 of the base 40 now engages the corresponding taper 19 in adaptor 12. Teeth 43 impart a limited amount of controlled resilience to the tapered portion 41 of insert 14 to assist in centering insert in adaptor 12.

Projections 44 on insert 14 exactly mate with recesses 24 in adaptor 12 so that the projections 44 may drop through recesses 24 without interference. At the same time, base 40 passes into bore 18 so that tapered portion 41 may mate with tapered surface 19. The insert 14 is inserted into adaptor 12 until the lower surfaces 46 of projections 44 contact the lower surface 21 of groove 20 in the adaptor 12. At this time, insert 14 has reached its "home" position in adaptor 12. The insert 14 is now rotated clockwise (as viewed from above) until the ramps 48 on projections 44 engage the ramps 34 on the lower surface of projections 22.

The ramped upper surface 48 of projections 22 and the ramped lower surface 34 of projections 22 are complementary.

Figure 2:
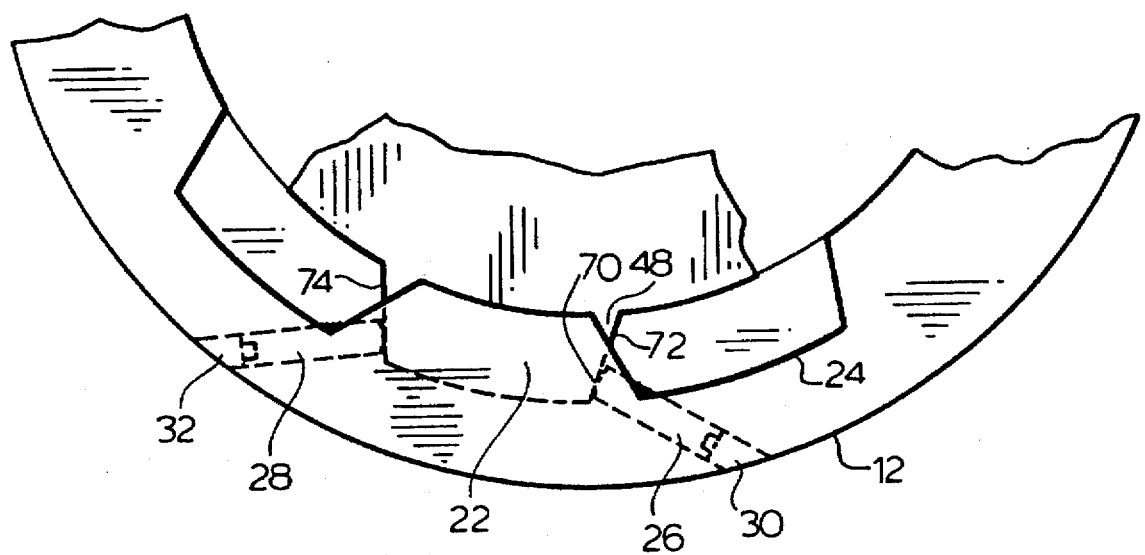
FIG. 2 is an enlarged view of the locking mechanism used to secure the mating parts of the device of this invention together.

Insert 14 may be twisted in a clockwise manner by means of a wrench being applied to flats 58. As soon as the upper surfaces 48 of projections 44 engage surfaces 34 at projections 22, the set screw 26 in bore 30 may be advanced so that its end 70 engages surface 72 of projection 48 of insert 14. The screw 26 will advance to lock the insert 14 in adaptor 12. (See FIG. 2)

Because of the mating tapered parts 19 and 41, it will be found that insert 14 is exactly centered in adaptor 12. The device may now be used in the workplace to accomplish the desired mechanical operation on a workpiece mounted on mandrel 66.

When it is desired to remove insert 14 from adaptor 12, set screw 26 is withdrawn from engagement with the surface 72. When set screw 26 is fully retracted, set screw 28 may be advanced to push against surface 74 to unlock insert 14 in adaptor 12 and to force insert 14 to rotate a slight distance in the counterclockwise direction.

At this time, the surfaces 48 and 34 disengage and insert 14 may be rotated counterclockwise until projections 44 and recesses 24 are in registry. Member 14 may now be lifted out of adaptor 12 and stored for future use. Another mandrel having different physical characteristics for receiving a different workpiece may now be mounted in adaptor 12 and locked in place with set screw 26 as previously.

The mandrel change may be accomplished in a matter of seconds.

The quick change mandrel of this invention will enable a lathe operator to exchange mandrels in a fraction of the time previously required with a minimum of delay in the operation of the shop machine or engine lathe.

The actual workpiece clamping mechanism is not important to the invention but is included for clarity of description.

The particular method of mounting has other distinct advantages. When taper 41 is inserted in taper 19 in bore 18, there is little opportunity for surface wear of the mating parts because of the large surface areas in contact with each other. The lower surfaces 46 of projections 44 are flat and are in the same plane on insert 14 and thus contact surface 21 simultaneously so as to distribute the forces set up by the engagement of ramps 34 and 48 evenly at each of the projection.

The surfaces most subject to wear are ramps 34 and 48 and because of the nature of the mating surfaces, any wear occurring is accommodated by slightly increasing the relative rotational travel of the two parts 12 and 14 during coupling.

The exchange of mandrels does not involve the removal of bolts, screws or studs so that the problem of loss or misplacement of fastening members is eliminated.

Because the critical surfaces (i.e. 34, 21 and 19) of the adaptor 12 are formed in the interior thereof, they are not as subject to damage due to collisions with foreign objects in the workplace, thus damage to the critical surfaces is almost impossible.

It will be seen that this invention has provided an exchangeable insert which is user friendly and tolerates considerable wear of the mating parts without loss of accuracy and precision.

Although changes in the construction are possible, applicant prefers to limit the ambit of his protection to the following claims.

I claim:

1. A mandrel for gripping and clamping a workpiece for rotation about a spin axis of a lathe comprising:

an adaptor for mounting on a suitable lathe spindle, said adaptor having a receptacle therein having female bayonet means therein, an insert for mounting in said adaptor receptacle, said insert having suitable workpiece receiving means on one end thereof, said insert having male bayonet means projecting from the opposite end thereof, said adaptor and insert being coupled together by insertion of said male bayonet means into said female bayonet means.

2. A mandrel for a lathe comprising an adaptor and an insert, said adaptor having mounting means for mounting the adaptor on the rotating spindle of a lathe, said adaptor having a receptacle for receiving a suitable insert therein, said adaptor having an annular reference plane formed in said cavity with a series of projecting ears formed in said cavity in predetermined spaced relationship with said plane an insert for mounting in said receptacle, said insert having a reference plane formed by a second series of projecting ears formed on said insert, said insert being insertable into said adaptor receptacle until said reference planes engage whereupon the adaptor and insert may be rotated relatively to cause the projecting ears of the adaptor and insert to engage and lock the adaptor and insert together.

3. A composite mandrel for gripping and clamping a rotatable workpiece suitable for rotation in a machine such as an engine lathe or grinder comprising:

an adaptor having suitable means for mounting said adaptor on the rotating spindle of said machine, said adaptor having a cavity formed therein, said cavity defining at least one reference surface and, an insert for reception within said cavity, said insert having at least one corresponding reference surface to mate with the reference surface of said adaptor, said adaptor and insert each having co-operating locking means associated therewith, and locking means being actuated by twisting said insert with respect to said adaptor within said cavity for forcing said reference surfaces together, said insert having means for gripping and clamping a suitable workpiece thereon.

4. A composite mandrel as claimed in claim 3 wherein said cavity in said adaptor is substantially cylindraceous, and the reference surface is formed in an annular recess in said cavity, such that the reference surface lies in a plane orthogonal to the spin axis of the adaptor.

5. A composite mandrel as claimed in claim 4 wherein said adaptor cavity defines a second reference surface formed adjacent said annular recess, said second reference surface being conical in nature and being in juxtaposition with said planar reference surface.

6. A composite mandrel as claimed in claim 3 wherein said insert contains a cylindraceous projecting portion for insertion into said cavity, said insert having a series of radially projecting members each having a common surface lying in a first reference plane, said first reference plane being orthogonal to the spin axis of said insert.

7. A composite mandrel as claimed in claim 6 wherein said insert contains a second reference surface on said projecting portion, said second reference surface being conical in nature and being in juxtaposition to said first reference surface.

8. A composite mandrel as claimed in claim 3 wherein said cavity in said adaptor is substantially cylindraceous and the reference surface is formed in an annular recess in said cavity such that the reference surface lies in a plane orthogonal to the spin axis of the adaptor, and said insert contains a cylindraceous projecting portion for insertion into said cavity, said insert having a series of radially projecting members each having a common surface lying in a reference plane which is orthogonal to the spin axis of said insert, said insert being insertable into said cavity in said adaptor until the common surfaces of said projecting members engage said reference surface of said adaptor cavity, locking means for pressing and locking said projecting members against said reference surface.

9. A composite mandrel as claimed in claim 8 wherein said adaptor and said insert each contain a second reference surface, said second reference surfaces being conical in nature and complimentary so as to allow the conical surface on the projecting member to engage the complimentary conical surface on said adaptor, said pressing and locking means also serving to press said conical surfaces together.

10. A composite mandrel comprising two mating parts which is intended to be mounted on the rotating spindle of a lathe or other similar type of rotating machine, said mandrel having the capability of chucking a suitable workpiece thereon for suitable rotation about the rotating spindle axis, said first mating part comprising adaptor means to enable said first part to be mounted on said spindle for rotation therewith, said first mating part also having a cavity for receiving a second mating part therein, said cavity having at least one reference surface formed therein, said cavity having at least one reference surface formed therein, a first series of spaced projections protruding inwardly and axially spaced a predetermined distance from said reference surface, said first projections being separated by a series of spaced recesses, a second mating part for insertion into the cavity of said first mating part, said second mating part having a reference surface thereon defined by a second series of spaced projections which co-operate with the recesses and projections in said first mating part.

11. A mandrel as claimed in claim 10 wherein each of the projections of, said first series of projections has a ramp surface in predetermined spaced relationship with said reference surface of the first part, and, each projection of said second series of projections has a ramp surface in predetermined spaced relationship with said reference surface of the second part, the ramp surfaces of the projections of said first and second parts being complimentary.

12. A mandrel as claimed in claim 11 wherein the reference surfaces of the first and second parts are engaged when said parts are coupled together, and ramp surfaces of the first and second series of projections are engaged by relative twisting of said first and second parts.

13. A mandrel as claimed in claim 10 wherein the reference surface in said cavity is formed by an annular groove in said cavity, said reference surface being flat and in a plane orthogonal to the spin axis, a second reference surface formed in said cavity in juxtaposition to said reference surface, said second reference surface having a conical shape.

14. A mandrel as claimed in claim 13 wherein said second mating part has a second reference surface adjacent the reference surfaces formed by the second series of projections, said second reference surface being in juxtaposition with the reference surface formed by said second series of projections, said second reference surface being of a conical shape and being complimentary to the conical reference surface in said cavity.

15. A mandrel as claimed in claim 13 wherein the conical reference surface of the second mating part is divided by a series of spaced slots to form a series of teeth.

* * * * *